(12) United States Patent
Slaiwa et al.

(10) Patent No.: US 12,460,302 B2
(45) Date of Patent: Nov. 4, 2025

(54) METHOD OF TREATING A COATED CUTTING TOOL

(71) Applicant: AB SANDVIK COROMANT, Sandviken (SE)

(72) Inventors: Warka Slaiwa, Stockholm (SE); Nima Zarif Yussefian, Stockholm (SE); Gabriel Paulsrud, Stockholm (SE)

(73) Assignee: AB Sandvik Coromant, Sandviken (SE)

( * ) Notice: Subject to any disclaimer, the term of this patent is extended or adjusted under 35 U.S.C. 154(b) by 0 days.

(21) Appl. No.: 17/638,366

(22) PCT Filed: Aug. 27, 2020

(86) PCT No.: PCT/EP2020/073911
§ 371 (c)(1),
(2) Date: Feb. 25, 2022

(87) PCT Pub. No.: WO2021/037947
PCT Pub. Date: Mar. 4, 2021

(65) Prior Publication Data
US 2022/0298644 A1    Sep. 22, 2022

(30) Foreign Application Priority Data

Aug. 30, 2019    (EP) .................................. 19194612

(51) Int. Cl.
*C23C 28/04* (2006.01)
*C23C 16/34* (2006.01)
(Continued)

(52) U.S. Cl.
CPC ............ *C23C 28/044* (2013.01); *C23C 16/34* (2013.01); *C23C 16/56* (2013.01); *C23C 28/042* (2013.01); *C23C 30/005* (2013.01)

(58) Field of Classification Search
None
See application file for complete search history.

(56) References Cited

U.S. PATENT DOCUMENTS

2003/0029522 A1    2/2003  Moreman
2003/0060306 A1*   3/2003  Aldrich ................. A63B 53/04
                                                                     473/342
(Continued)

FOREIGN PATENT DOCUMENTS

CN          101218371 A      7/2008
CN          102352512 A      2/2012
(Continued)

OTHER PUBLICATIONS

Kumar et al. "Laser shock peening wavelength conditions for enhancing corrosion behavior of titanium alloy in chloride environment". Feb. 2019 Jol. Brazilian Mech. Sci and eng. 41, 129.*

(Continued)

*Primary Examiner* — Mandy C Louie
(74) *Attorney, Agent, or Firm* — Corinne R. Gorski

(57) ABSTRACT

A method of treating a coated cutting tool using laser shockpeening (LSP) is provided. The coated cutting tool includes a substrate and a coating, wherein the substrate is of cemented carbide or cermet. The coating includes a CVD layer and/or a PVD layer. The method includes the step of applying LSP to at least a portion of the cutting tool, wherein the LSP energy density is within 0.4 to 1.6 $J/mm^2$ and wherein the LSP applies laser pulses to the at least one portion of the cutting tool.

16 Claims, 3 Drawing Sheets

(51) Int. Cl.
    *C23C 16/56*     (2006.01)
    *C23C 30/00*     (2006.01)

(56) References Cited

U.S. PATENT DOCUMENTS

| | | | |
|---|---|---|---|
| 2006/0254681 A1 | 11/2006 | Mannava et al. | |
| 2011/0220415 A1* | 9/2011 | Jin | C23C 14/024 |
| | | | 175/320 |
| 2013/0052479 A1 | 2/2013 | Seetharaman | |
| 2015/0298215 A1 | 10/2015 | Bjormander | |
| 2018/0073122 A1* | 3/2018 | Wang | C23C 8/32 |

FOREIGN PATENT DOCUMENTS

| | | | | |
|---|---|---|---|---|
| CN | 202163098 | * | 3/2012 | |
| CN | 103060528 A | | 4/2013 | |
| CN | 105200226 A | | 12/2015 | |
| CN | 106269998 | * | 1/2017 | ............. B21D 1/00 |
| CN | 109750242 | * | 5/2019 | |
| EP | 3064600 A1 | * | 9/2016 | ......... B23K 26/0622 |
| JP | 2005272989 A | | 4/2007 | |
| JP | 2009083096 A | | 4/2009 | |
| JP | 2012223872 A | | 11/2012 | |
| JP | 2013107143 A | | 6/2013 | |
| KR | 20130094893 | * | 8/2013 | ............. H10K 71/00 |
| WO | WO-2018215996 A1 | * | 11/2018 | ............. B22F 3/105 |

OTHER PUBLICATIONS

Peng C et al: "Influence of Laser Shock Processing on WC-Co Hardmetal", Materials and Manufacturing Processes, vol. 31, No. 6, Dec. 9, 2015, pp. 794-801.

\* cited by examiner

METHOD OF TREATING A COATED CUTTING TOOL

RELATED APPLICATION DATA

This application is a § 371 National Stage Application of PCT International Application No. PCT/EP2020/073911 filed Aug. 27, 2020 claiming priority to EP 19194612.8 filed Aug. 30, 2019.

TECHNICAL FIELD

The present invention relates to laser shock peening of coated cutting tools, wherein the cutting tool has a substrate of cermet or cemented carbide and a coating comprising layers made by CVD and/or PVD.

BACKGROUND

Cermet and cemented carbide are materials composed of hard constituents in a metallic binder. These materials are common substrates in cutting tools with properties such as high hardness, high resistance to wear, high toughness. These substrates are usually coated with a wear resistant coating such as a CVD coating of layers of for example TiCN and alumina or a PVD coating with layers of for example TiN and TiAlN.

The coated cutting tools are usually treated with a surface treatment to improve its life time in cutting further. Common surface treatments are brushing to smoothen the outer surface or shaping the cutting edge, shot blasting to smoothen the surface and also to influence the residual stress levels in the surface area of the cemented carbide or in the coating.

Laser shock peening is a method wherein laser is used to influence properties of the surface zone. Laser pulses with short duration time and high intensity are scanned over a surface. Each laser pulse creates a local plasma formed on the surface and thereby a shock wave is created that propagates into the object that is treated. This shock wave influences the material in the surface zone such that an increased hardness, toughness and a change in residual stress level occur.

WO 2018/215996 A1 discloses a method of treating cutting tools of cemented carbide with laser shock peening.

SUMMARY OF THE INVENTION

It is an object of the present invention to provide an improved method of treating coated cutting tools comprising a substrate of cermet or cemented carbide.

The present invention relates to a method of treating a coated cutting tool using laser shock peening (LSP), the coated cutting tool consists of a substrate and a coating, wherein the substrate is of cemented carbide or cermet, preferably cemented carbide, and wherein the coating comprises a CVD layer and/or a PVD layer, wherein said method comprises the step of applying LSP to at least a portion of the cutting tool, wherein the LSP energy density is within 0.4 to 1.6 J/mm$^2$, preferably within 0.9 to 1.4 J/mm$^2$, more preferably within 1.1 to 1.3 J/mm$^2$.

It has surprisingly been found that there is an optimum in the performance of a cutting tool if the laser shock peening is performed with the settings of the LSP energy density within 0.4 to 1.6 J/mm$^2$, preferably within 0.9 to 1.4 J/mm$^2$. If the LSP energy density is too low the impact from the LSP is too low to result in an improved edge line toughness or wear resistance. If the LSP energy density is too high there is a higher risk of reduced stresses in the surface area and thereby a reduced edge line chipping resistance.

In one embodiment of the present invention the LSP comprises applying laser pulses to the at least a portion of the cutting tool, and wherein the laser pulse energy density is 0.04 to 1.0 J/mm$^2$, preferably 0.04-0.5 J/mm$^2$, more preferably 0.04-0.1 J/mm$^2$, even more preferably 0.05-0.07 J/mm$^2$ In one embodiment of the present invention a black paint or a black tape is applied to the coated cutting tool prior to applying LSP. An advantage with the usage of a black paint or a black tape is that the coating underneath can be kept without any decrease in thickness or change in appearance.

In one embodiment of the present invention the coating comprises an outer layer of one or more of TiN, TiCN, TiC, TiB$_2$, ZrCN, TiAlN or TiSiN. These layers can be used as the absorption layer instead of a paint or a tape. An advantage with these layers is that they can be deposited as part of the CVD or PVD coating, and thus an extra step of applying a black tape or paint can be avoided. A further advantage is that the effect of the LSP seems to be more pronounced using these layers, inducing a higher level of residual stress in the surface area of the substrate.

In one embodiment of the present invention the thickness of the outer layer is preferably 2-5 μm. If the thickness of the outer layer is to thin, a wear resistant layer beneath will be reduced in thickness during the LSP. If the thickness is larger than 5 μm the induces residual stresses in the substrate are less and therefore improvement from LSP on tool life becomes less pronounced.

In one embodiment of the present invention the coated cutting tool further comprises a layer of Al$_2$O$_3$ located between the substrate and the outer layer. This layer of Al$_2$O$_3$ is preferably an α-Al$_2$O$_3$-layer. This is advantageous in that it is a very wear resistant layer.

In one embodiment of the present invention the coated cutting tool further comprises a layer of TiCN located between the substrate and the outer layer.

In one embodiment of the present invention the coated cutting tool further comprises a layer of TiAlN located between the substrate and the outer layer.

In one embodiment of the present invention the total thickness of the coating is 2-20 μm.

In one embodiment of the present invention the total thickness of the coating is 2-10 μm.

In one embodiment of the present invention the cutting tool comprises a rake face and a flank face and a cutting edge therebetween, and wherein the LSP is applied on a portion of the cutting edge and at least a portion of the rake face.

In one embodiment of the present invention the LSP step is followed by a blasting, polishing and/or brushing step, preferably a blasting step such as shot blasting. Advantages with blasting, polishing and brushing are that the surface of the cutting tool can be finished by any of these techniques and thereby the cutting performance of the cutting tool can be improved. Shot blasting is advantageous since both the surface roughness and the residual stress level in the coating can be influenced, a lower surface roughness and a reduced tensile stress level or a higher compressive stress level can be achieved in the coating, such that the cutting tool life time can be extended.

In one embodiment of the present invention the cutting tool comprises a rake face and a flank face and a cutting edge therebetween, and wherein the LSP is only applied to a portion the cutting edge and a portion of the rake face and/or the flank face of the cutting tool, wherein the width (b) of said area is up to 5 mm from the cutting edge, preferably the width (b) of said area is 1-5 mm from the cutting edge. It is advantageous to apply LSP on at least the area that are to be involved in cutting. The extension from the edge and on the rake face should be at least the cutting depth, $a_p$, in application.

In one embodiment of the present invention the LSP is applied along the whole cutting edge of the cutting tool.

In one embodiment of the present invention the LSP is applied on the whole rake face of the cutting tool.

In one embodiment of the present invention the LSP is applied to the whole rake face, the whole edge and also the whole flank face of the cutting tool.

In one embodiment of the present invention the wave length of the laser during the LSP step is within 1000 to 1100 nm, preferably within 1050 nm to 1070 nm, more preferably about 1064 nm.

In one embodiment of the present invention the frequency of the laser during the LSP step is within 150 000 to 250 000 Hz, preferably about 200 000 Hz.

In one embodiment of the present invention the pulse duration of the laser during the LSP step is within 0.005 to 0.02 ns, preferably about 0.01-0.02 ns.

In one embodiment of the present invention the average effect of the laser during the LSP step is within 13 to 16 W, preferably about 15 W.

In one embodiment of the present invention the spot size of the laser during the LSP step is within 0.03 to 0.05 mm, preferably about 0.04 mm.

In one embodiment of the present invention the peak power density of the laser during the LSP step is within 3 to 7 $GW/mm^2$, preferably about 6 $GW/mm^2$. This level of peak power density can be varied by varying either of the frequency, the pulse length, the effect of the laser or the spot size. A peak power density of within 3 to 7 $GW/mm^2$ is advantageous in that the resulting peak pressure is high and thereby providing an improvement on the life time of the cutting tool.

In one embodiment of the present invention the LSP is applied on the coated cutting tool when the coated cutting tool is submerged in water.

Still other objects and features of the present invention will become apparent from the following examples considered in conjunction with the accompanying drawings.

DEFINITIONS

By "cutting tool" is herein meant a cutting tool for metal cutting applications such as an insert, an end mill or a drill. The application areas can for example be turning, milling or drilling.

By "cemented carbide" is herein meant a material that comprises at least 50 wt % WC, possibly other hard constituents common in the art of making cemented carbides and a metallic binder phase preferably selected from one or more of Fe, Co and Ni.

By "cermet" is herein meant a material comprising a hard constituent and metallic binder phase where the hard constituent is one or more of titanium carbonitride, titanium carbide and titanium nitride. The metallic binder phase in cermet is preferably selected from one or more of Fe, Co and Ni, preferably Co. Other hard constituents common in the art of cermets are selected from carbides, nitrides or carbonitrides of Ti, Ta, Nb, Zr, V and Cr. The cermet material comprises no free hexagonal WC. Cermet materials based on titanium carbonitride are the most common cermet materials of today.

"LSP energy density" is herein denoted the average energy density that is applied to the cutting tool in the LSP treated portion or area. An increased pulse overlap or an increased laser pulse energy density results in an increased LSP energy density.

"Laser pulse energy density" is herein denoted the average energy density of one single laser pulse. An increased pulse duration or increased effect results in an increased laser pulse energy density.

"Shot blasting" is herein denoted a process using abrasive grains wherein material typically is removed from the treated surface by abrasive wear. Shot blasting is well known in the field of cutting tools and is for example known to introduce residual stresses in a coating on a cutting tool.

EXAMPLES

Exemplifying embodiments of the present invention will now be disclosed in more detail and compared to comparative embodiments. Coated cutting tools (inserts) were prepared, analyzed and evaluated in cutting tests.

Substrate

Figure 1:
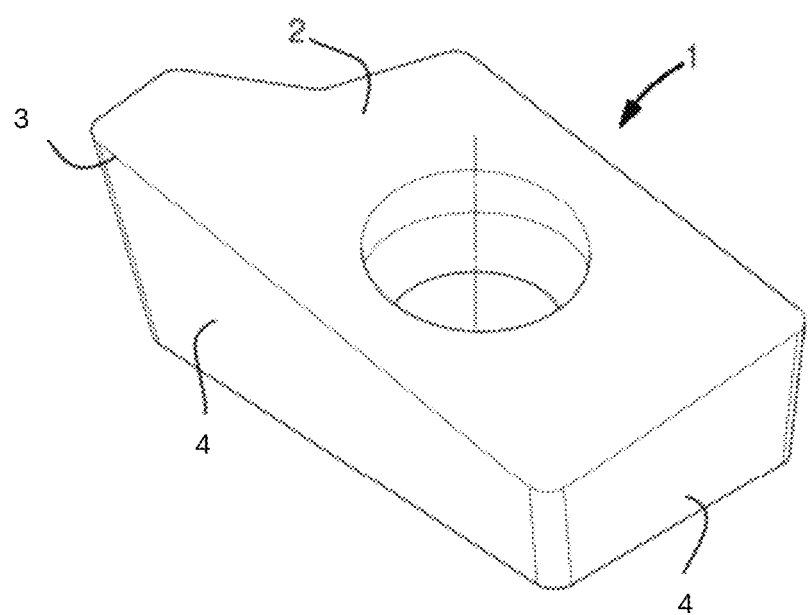
FIG. 1 A drawing of a cutting tool (1) that can be treated according to the present invention wherein the rake face (2), the flank face (4) and the cutting edge (3) are indicated. The geometry of the cutting tool corresponds to the geometry that was used in the following examples.

Cemented carbide substrates of ISO-type R390-11T308M-PM for milling were manufactured, see FIG. 1.

Two different cemented carbide compositions were manufactured. Substrate A was manufactured from a powder mixture with a composition of about 13.50 wt % Co, 0.57 wt % Cr and balance WC. Substrate B was manufactured from a powder mixture with a composition of about 9.14 wt % Co, 1.15 wt % Ta, 0.27 wt % Nb, 0.05 wt % Ti and balance WC. The powder mixtures was milled, dried, pressed into green bodies and sintered at 1450° C. to form sintered cemented carbide substrates.

Coating

CVD coatings were deposited on the two cemented carbide compositions. The CVD coating was composed of an inner TiN layer of 0.5 μm in thickness, a subsequent wear resistant TiCN layer with a thickness of 3.5 μm and thereon a wear resistant α-$Al_2O_3$ layer with a thickness of 3 μm. Thereafter an outer TiN layer was deposited with a thickness of 2 μm. The total coating thickness was about 9 μm.

LSP Process

Figure 2:
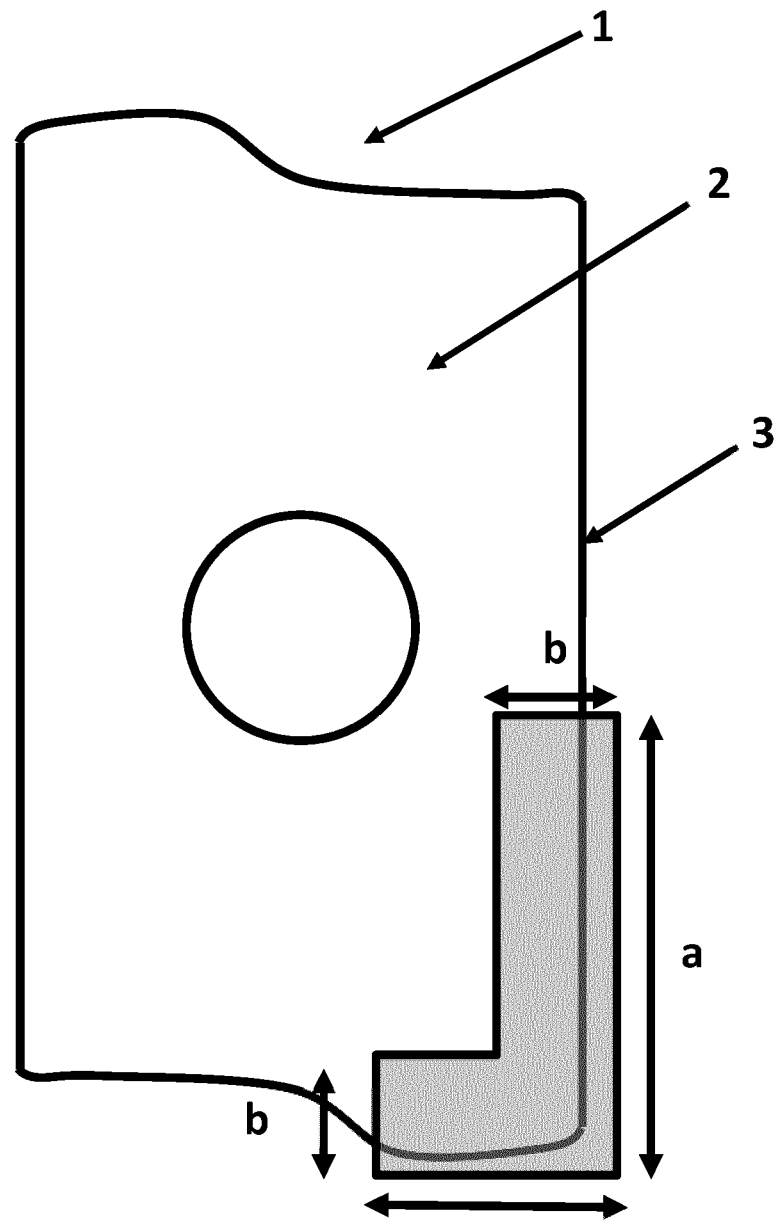
FIG. 2 Schematic view of the position and extension of the LSP area according to one embodiment of the present invention, showing the rake face (2) and the cutting edge (3) of a cutting tool (1).
Figure 3:
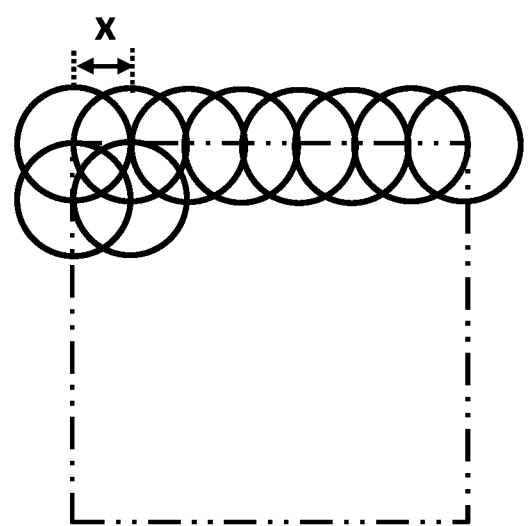
FIG. 3 A schematic drawing of laser pulses (circles) scanned over an area with a pulse step length x. The pulses overlap each other such that the whole area or portion is treated with LSP.

LSP was applied to the coated cutting tools in an area of the rake face covering also the edge. The width b of the area as measured perpendicular from the cutting edge of the cutting tool was about 3 mm. The extension a along the main cutting edge was about 6 mm and the extension c along the auxiliary cutting edge was about 3 mm. See a schematic drawing of the area of LSP in FIG. 2.

The LSP process was applied with 6 mm of water on the surface. The cutting tools were submerged in water during the LSP process.

The settings of the laser during the LSP were the following:

Wavelength: 1064 nm
Frequency: 200 kHz
Pulse duration: 0.01 ns
Pulse diameter, d: 0.04 mm
Laser power: 14.8 W
Peak power density: 5.89 GW/mm$^2$ The laser pulse energy density was 0.059 J/mm$^2$, calculated as follows:

$$\text{Laser pulse energy density }[\text{J/mm}^2] = \frac{\text{Laser pulse energy}}{\text{Pulse area}}$$

$$\text{Laser pulse energy }[\text{J}] = \frac{\text{Laser power}}{\text{Frequency}}$$

$$\text{Pulse area }[\text{mm}^2] = \frac{\pi d^2}{4}$$

The LSP energy density was adjusted by varying the pulse distance, i.e. the pulse step length x, and thereby the pulse overlap such that a smaller pulse distance and thereby a larger pulse overlap results in a larger LSP energy density. The laser pulse overlap relates to the pulse step length x and the pulse diameter d:

$$\text{Laser pulse overlap} = \frac{d-x}{d}$$

The LSP energy densities for the samples are shown in Table 1.

$$LSP \text{ energy density}\left[\frac{\text{J}}{\text{mm}^2}\right] =$$

Laser pulse energy × number of pulses per mm$^2$ $$\text{number of pulses per mm}^2 = \frac{1}{x^2}$$

TABLE 1

| Sample | Pulse step length x [μm] | Pulse overlap [%] | LSP energy density [J/mm$^2$] |
|---|---|---|---|
| A0 | — | — | — |
| B0 | | | |
| A1 | 7 | 82.5 | 1.51 |
| B1 | | | |
| A2 | 8 | 80 | 1.16 |
| B2 | | | |
| A3 | 9.5 | 76.3 | 0.82 |
| B3 | | | |
| A4 | 11.2 | 72 | 0.59 |
| B4 | | | |
| A5 | 13 | 67.5 | 0.44 |
| B5 | | | |

Shot Blasting Process

Subsequent to the LSP, the cutting tools were subjected to shot blasting to remove the outer TiN layer. The time of shot blasting was slightly adjusted to remove all TiN from the area of the rake face that had been treated by LSP. The shot blasting was performed with abrasive alumina and an air pressure of 2.1 bar. Also the samples A0 and B0 were subjected to shot blasting.

Cutting Performance 1

Inserts with substrate A were then tested in a milling operation at the following parameters:

Work piece material: Dievar unhardened, PL 129 200× 200×100, MC P3. 0.Z.AN, CMC 03.11,
Charge: M10205
$v_c$=200 m/min
$f_z$=0.15 mm
$a_e$=12 mm
$a_p$=3.0
z=1
length of cut=12 mm
No cutting fluid was used.
Insert type R390-11T308M-PM The tool life criterion was set to chipping of at least 0.5 mm of the edge line. Tool life is presented as the average number of cut entrances in order to achieve this criterion. The average tool life is presented in Table 2 and the tool life is the average number of cuts and it is an average of 8 parallel cutting test.

TABLE 2

| Sample | LSP energy density [J/mm$^2$] | Average life time [No of cuts] |
|---|---|---|
| A0 | — | 8.8 |
| A1 | 1.51 | 31.6 |
| A2 | 1.16 | 43.6 |
| A3 | 0.82 | 32.5 |
| A4 | 0.59 | 27.9 |
| A5 | 0.44 | 31.8 |

Cutting Performance 2

Inserts with substrate B were then tested in a milling operation at the following parameters:

Work piece material: Dievar unhardened, PL 129 200× 200×100, MC P3. 0. Z.AN, CMC 03.11,
Charge: M10205
$v_c$=160 m/min
$f_z$=0.2 mm
$a_e$=12 mm
$a_p$=3.0
z=1
length of cut=12 mm
No cutting fluid was used.
Insert type R390-11T308M-PM The tool life criterion was set to chipping of at least 0.5 mm of the edge line. Tool life is presented as the average number of cut entrances in order to achieve this criteria. The average tool life is presented in Table 3 and the tool life is the average number of cuts and it is an average of 8 parallel cutting test.

TABLE 3

| Sample | LSP energy density [J/mm$^2$] | Average life time [No of cuts] |
|---|---|---|
| B0 | — | 4.8 |
| B1 | 1.51 | 7.9 |

TABLE 3-continued

| Sample | LSP energy density [J/mm$^2$] | Average life time [No of cuts] |
|---|---|---|
| B2 | 1.16 | 9.6 |
| B3 | 0.82 | 7.6 |
| B4 | 0.59 | 7.9 |
| B5 | 0.44 | 6.5 |

While the invention has been described in connection with various exemplary embodiments, it is to be understood that the invention is not to be limited to the disclosed exemplary embodiments, on the contrary, it is intended to cover various modifications and equivalent arrangements within the appended claims. Furthermore, it should be recognized that any disclosed form or embodiment of the invention may be incorporated in any other disclosed or described or suggested form or embodiment as a general matter of design choice. It is the intention, therefore, to be limited only as indicated by the scope of the appended claims appended hereto.

The invention claimed is:

1. A method of treating a coated cutting tool using laser shock peening (LSP), the coated cutting tool including a substrate and a coating, wherein the substrate is of cemented carbide or cermet, and wherein the coating comprises a CVD layer and/or a PVD layer, the coating including an outer layer of one or more of TiN, TiCN, TiB$_2$, ZrCN, TiAlN or TiSiN, and wherein said method comprises a step of applying LSP to at least a portion of the coated cutting tool, wherein a LSP energy density is within 0.4 to 1.6 J/mm$^2$, wherein the outer layer has a thickness of 2-20 μm, and wherein the cutting tool includes a rake face and a flank face and a cutting edge extending between the flank face and the rake face, and wherein the LSP is applied on a portion of the cutting edge and at least a portion of the rake face.

2. The method according to claim 1, wherein the LSP comprises applying laser pulses to the at least the portion of the cutting tool, and wherein the laser pulse energy density is 0.04 to 1.0 J/mm$^2$.

3. The method according to claim 1, wherein a wave length of the laser during the LSP step is within 1000 to 1100 nm.

4. The method according to claim 1, wherein a black paint or a black tape is applied to the coated cutting tool prior to applying LSP.

5. The method according to claim 1, wherein the coated cutting tool further comprises a layer of Al$_2$O$_3$ located between the substrate and the outer layer.

6. The method according to claim 1, wherein the coated cutting tool further comprises a layer of TiCN located between the substrate and the outer layer.

7. The method according to claim 1, wherein the coated cutting tool further comprises a layer of TiAlN located between the substrate and the outer layer.

8. The method according to claim 1, wherein a total thickness of the coating is 2-20 μm.

9. The method according to claim 1, wherein the LSP step is followed by a blasting, polishing and/or brushing step.

10. The method according to claim 1, wherein the cutting tool includes a rake face and a flank face and a cutting edge extending between the flank face and the rake face, and wherein the LSP is only applied to a portion of the cutting edge and a portion of the rake face and/or the flank face of the cutting tool, wherein a width of the portion of the cutting edge and/or the portion of the rake face and/or the flank face is up to 5 mm from the cutting edge.

11. The method according to claim 1, wherein a frequency of the laser during the LSP step is within 150 000 to 250 000 Hz.

12. The method according to claim 1, wherein an average effect of the laser during the LSP step is within 13 to 16 W.

13. The method according to claim 1, wherein a peak power density of the laser during the LSP step is within 3 to 7 GW/mm$^2$.

14. The method according to claim 9, wherein the blasting step comprises shot blasting.

15. The method according to claim 1, wherein the LSP energy density is within 0.9-1.4 J/mm$^2$.

16. A method of treating a coated cutting tool using laser shock peening (LSP), the coated cutting tool including a substrate and a coating, wherein the substrate is of cemented carbide or cermet, and wherein the coating comprises a CVD layer and/or a PVD layer, the coating including an outer layer of one or more of TiN, TiCN, TiB$_2$, ZrCN, TiAlN or TiSiN, and wherein said method comprises a step of applying LSP to at least a portion of the coated cutting tool, wherein a LSP energy density is within 0.4 to 1.6 J/mm$^2$.

* * * * *